US011320843B2

(12) United States Patent
Chen

(10) Patent No.: US 11,320,843 B2
(45) Date of Patent: May 3, 2022

(54) AIR COMPRESSION SYSTEM WITH PRESSURE DETECTION

(71) Applicant: DONGGUAN HESHENG MACHINERY & ELECTRIC CO., LTD., Dongguan (CN)

(72) Inventor: Chi-Wen Chen, Dongguan (CN)

(73) Assignee: DONGGUAN HESHENG MACHINERY & ELECTRIC CO., LTD., Dongguan (CN)

( * ) Notice: Subject to any disclaimer, the term of this patent is extended or adjusted under 35 U.S.C. 154(b) by 452 days.

(21) Appl. No.: 16/655,246

(22) Filed: Oct. 17, 2019

(65) Prior Publication Data

US 2021/0116948 A1 Apr. 22, 2021

(51) Int. Cl.
*G05D 16/20* (2006.01)
*G01L 17/00* (2006.01)
*G01L 13/00* (2006.01)

(52) U.S. Cl.
CPC .......... *G05D 16/2066* (2013.01); *G01L 13/00* (2013.01); *G01L 17/00* (2013.01); *Y10T 137/36* (2015.04)

(58) Field of Classification Search
CPC ............ G05D 16/2066; G05D 16/2073; G01L 13/00; G01L 17/00; Y10T 137/36
USPC ......................................... 417/44.2; 137/224
See application file for complete search history.

(56) References Cited

U.S. PATENT DOCUMENTS

| 4,456,038 | A | * | 6/1984 | Gwaltney | ............... | B60S 5/046 137/224 |
| 4,651,838 | A | * | 3/1987 | Hamilton | ......... | B60G 17/01933 177/209 |
| 4,863,355 | A | * | 9/1989 | Odagiri | .................... | F04B 41/02 417/44.1 |
| 4,961,441 | A | * | 10/1990 | Salter | ................. | G05D 16/2053 251/30.02 |
| 5,325,884 | A | * | 7/1994 | Mirel | .................... | G05D 7/0652 137/486 |
| 5,443,087 | A | * | 8/1995 | Myles | ................. | G05D 16/2053 264/572 |
| 5,551,770 | A | * | 9/1996 | Hrovat | .................... | B60T 8/175 303/167 |
| 5,630,798 | A | * | 5/1997 | Beiser | ................. | A61M 3/0216 604/30 |
| 5,762,539 | A | * | 6/1998 | Nakashiba | .............. | B24B 37/30 451/286 |

(Continued)

*Primary Examiner* — William M McCalister
(74) *Attorney, Agent, or Firm* — Leong C. Lei

(57) ABSTRACT

The air compression system includes an air compressor and a detection device. A first pressure transducer is provided to measure an air pressure at an output port of the air compressor. A second pressure transducer in the detection device measures an air pressure in a channel of the detection device. A conduit in the detection device regulates an air flow to be compatible with that flowing through the inlet of the aerated object. The measurements from the first pressure transducer and the second pressure transducer are transmitted to and compared by a first control circuit of the air compressor, and an internal pressure of the aerated object is estimated. When the estimated internal pressure of the aerated object is smaller than a desired pressure, the air compressor pumps air into the object through the conduit of the detection device in a linear manner.

5 Claims, 4 Drawing Sheets

(56) References Cited

U.S. PATENT DOCUMENTS

| | | | | |
|---|---|---|---|---|
| 5,916,016 A * | 6/1999 | Bothra | B24B 49/16 | 451/388 |
| 5,964,653 A * | 10/1999 | Perlov | B24B 37/32 | 451/286 |
| 5,980,361 A * | 11/1999 | Muller | B24B 49/16 | 451/288 |
| 6,277,009 B1 * | 8/2001 | Chen | B24B 37/32 | 451/388 |
| 6,328,690 B1 * | 12/2001 | Takami | A61B 1/015 | 417/44.2 |
| 6,435,956 B1 * | 8/2002 | Ohwada | B24B 49/10 | 451/41 |
| 6,506,105 B1 * | 1/2003 | Kajiwara | B24B 49/16 | 451/288 |
| 6,568,416 B2 * | 5/2003 | Tucker | G05D 7/005 | 251/5 |
| 6,722,946 B2 * | 4/2004 | Talieh | B24B 37/013 | 451/296 |
| 6,758,233 B2 * | 7/2004 | Sulatisky | G05D 16/2097 | 251/30.01 |
| 6,766,260 B2 * | 7/2004 | Ambrosina | G01F 1/68 | 702/45 |
| 6,894,607 B1 * | 5/2005 | Claussen | B60C 23/00372 | 137/225 |
| 7,476,088 B2 * | 1/2009 | Iimura | F04B 49/08 | 417/44.2 |
| 7,641,449 B2 * | 1/2010 | Iimura | F04B 49/06 | 417/18 |
| 7,717,680 B2 * | 5/2010 | Hoffman | B60C 23/00372 | 152/415 |
| 7,789,102 B2 * | 9/2010 | Beckman | F04B 49/20 | 137/505.11 |
| 7,922,457 B2 * | 4/2011 | Lindsey | F04C 28/08 | 417/12 |
| 8,033,797 B2 * | 10/2011 | Kehrmann | F04D 27/008 | 5/713 |
| 8,037,896 B2 * | 10/2011 | Shajii | G05D 16/206 | 137/599.09 |
| 8,257,053 B2 * | 9/2012 | Hase | F04B 41/06 | 417/18 |
| 8,277,197 B2 * | 10/2012 | Lelong | F04C 28/02 | 417/253 |
| 8,413,278 B2 * | 4/2013 | Chaffee | G05D 16/208 | 5/713 |
| 8,429,778 B2 * | 4/2013 | Receveur | G05B 15/02 | 700/282 |
| 8,784,070 B2 * | 7/2014 | Yokota | F04B 49/065 | 417/44.2 |
| 8,801,392 B2 * | 8/2014 | Wang | F16K 31/42 | 5/713 |
| 8,944,057 B2 * | 2/2015 | Hill | A61M 16/0069 | 128/200.24 |
| 9,010,328 B2 * | 4/2015 | Oates | A61M 16/024 | 128/202.22 |
| 9,345,335 B2 * | 5/2016 | Giori | A47C 27/088 | |
| 2002/0091467 A1 * | 7/2002 | Rose | G05D 16/2066 | 700/282 |
| 2002/0142704 A1 * | 10/2002 | Hu | B24B 37/16 | 451/41 |
| 2003/0065423 A1 * | 4/2003 | Vanderbeek | G05D 16/2073 | 700/282 |
| 2004/0041470 A1 * | 3/2004 | Imamura | B60T 8/1755 | 303/167 |
| 2004/0118403 A1 * | 6/2004 | O'Connor | A61M 16/0069 | 128/204.23 |
| 2004/0191073 A1 * | 9/2004 | Iimura | F04B 49/065 | 417/44.2 |
| 2005/0189018 A1 * | 9/2005 | Brodeur | G05D 7/0635 | 137/487.5 |
| 2005/0199287 A1 * | 9/2005 | Shajii | G05D 16/206 | 137/487.5 |
| 2006/0002800 A1 * | 1/2006 | Klein | F04B 49/022 | 417/44.1 |
| 2006/0163277 A1 * | 7/2006 | Vidal | B05C 11/1013 | 222/1 |
| 2012/0093662 A1 * | 4/2012 | Tsai | F04D 27/008 | 417/44.2 |
| 2014/0097165 A1 * | 4/2014 | Leisner | F04C 28/06 | 219/133 |
| 2015/0252809 A1 * | 9/2015 | Tsai | A47C 27/082 | 417/44.2 |
| 2017/0130728 A1 * | 5/2017 | Liu | F04D 25/166 | |

* cited by examiner

AIR COMPRESSION SYSTEM WITH PRESSURE DETECTION

BACKGROUND OF THE INVENTION

(a) Technical Field of the Invention

The present invention is generally related to air compression systems, and more particular to an air compression system with pressure detection.

(b) Description of the Prior Art

An air compressor usually involves an internal electric motor rotating a crankshaft, which in turn drives a piston into a reciprocal movement through a connecting rod, thereby compressing air in the cylinder. The compressed air is then output from a nozzle through a pipe via a one-way valve into an object to be aerated such as a tire.

To avoid the aerated object from explosion or damage, the conventional air compressor is equipped with a pressure gauge and a pressure detector, so that the air compressor aerates the object according to a preset pressure. During the aeration, if the pressure detector senses that the output air from the air compressor has reached the preset pressure (e.g., a certain pound per square inch), the air compressor stops pumping air so as to prevent the object from being overly aerated.

However, the pressure detector is usually installed adjacent to an output port of the air compressor, which must be greater than the internal pressure of the aerated object. In other words, what is detected by the pressure detector is not the true internal pressure of the aerated object. Therefore, when the air compressor stops pumping, there is actually a pressure difference between the true internal pressure of the aerated object and the preset pressure. The aerated object is as such not sufficiently pumped, compromising the performance and safety of the object.

Therefore, there are air compressors having their pressure detectors installed around the nozzles, aiming to obtain more accurate measurement and reduced pressure difference. However, the large-volume (high-pressure) air concentrating around the nozzle would lead to back pressure phenomenon, again leading to the pressure detector's measurement not reflecting the true internal pressure of the aerated object. For example, the pressure detector at the nozzle may detect abrupt pressure surge due to the back pressure, the air compressor may wrongly assume that the aerated object has reached the preset pressure and stop pumping.

Therefore, an issue to be resolved is that a mechanism is need to accurately detect an internal pressure of the aerated object and, furthermore, to pump the air in a linear manner according to the internal pressure of the aerated object.

SUMMARY OF THE INVENTION

The air compression system includes an air compressor, a detection device, and a pipe. The air compressor has at least an output port and a first control circuit, where the first control circuit is configured with a desired pressure, the first control circuit turns on or shuts off the air compressor based on the desired pressure, the first control circuit is electrically connected to a first pressure transducer and a first transceiver unit, the first pressure transducer is housed inside the air compressor adjacent to the output port and detects an air pressure from the output port, and an measure detected by the first pressure transducer is transmitted to the first control circuit. The detection device has a channel inside, where the channel has an end configured with a first port and another end configured with a second port, the second port is connected to a nozzle, the detection device also has a second control circuit electrically connected to a second pressure transducer and a third transceiver unit, the second pressure transducer is positioned between the first port and the second port detecting an air pressure in the channel, the third transceiver unit receives measurements from the second pressure transducer and transmits the measurements to the first transceiver unit, which in turn transmits the measurements to the first control circuit, the detection device has a conduit extended from the channel between the second pressure transducer and the first port, and the conduit has an air flow compatible with that of an inlet of an aerated object. The pipe has a first end and a second end, where the first end is connected to the output port, and the second end is connected to the first port of the detection device so that the air compressor is conducted to the detection device The gist of the present invention lies in the following. The first pressure transducer is provided to measure an air pressure at the output port of the air compressor. The second pressure transducer in the detection device measures an air pressure in the channel of the detection device. The conduit in the detection device regulates an air flow to be compatible with that flowing through the inlet of the aerated object. The measurements from the first pressure transducer and the second pressure transducer are transmitted to and compared by the first control circuit of the air compressor, and an internal pressure of the aerated object is estimated. When the estimated internal pressure of the aerated object is smaller than the desired pressure, the air compressor pumps air into the object through the conduit of the detection device in a linear manner. As such, the conventional air compressor's problem of delivering large-volume air, causing back pressure at the nozzle, inaccurate measurement to the internal pressure of the aerated object, and failure to properly aerate the object can be resolved.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
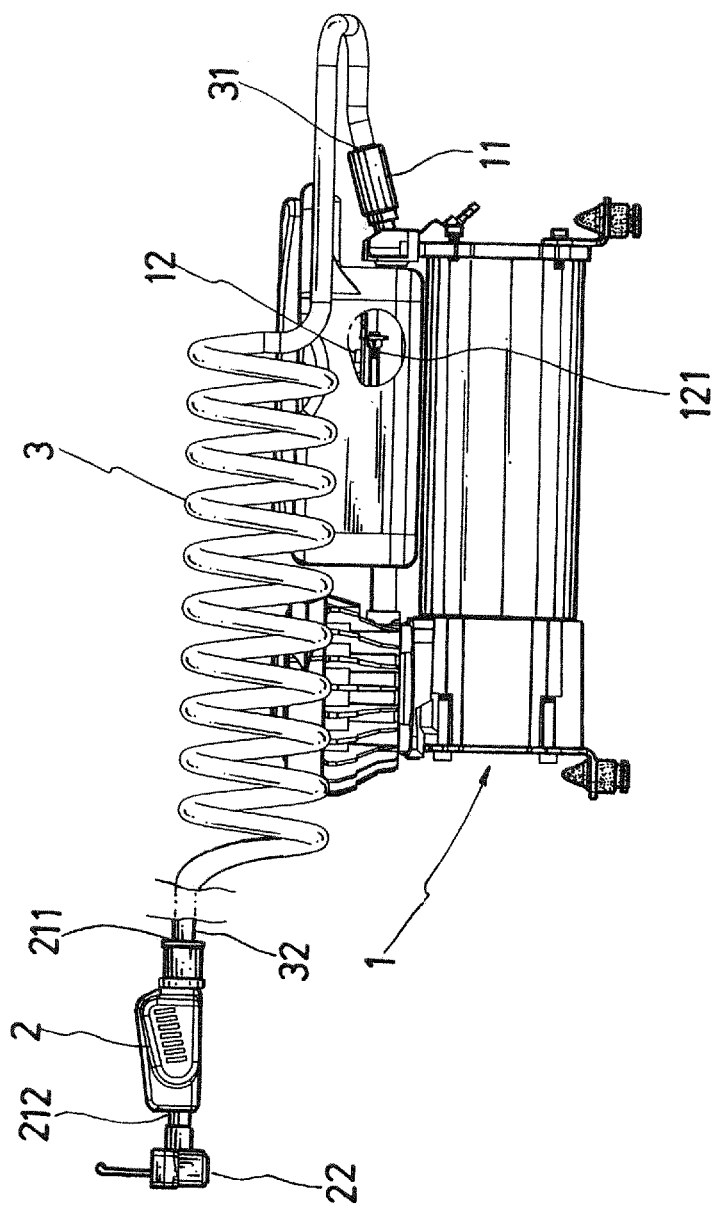
FIG. 1 is a side-view diagram showing an air compression system according to an embodiment of the present invention.
Figure 2:
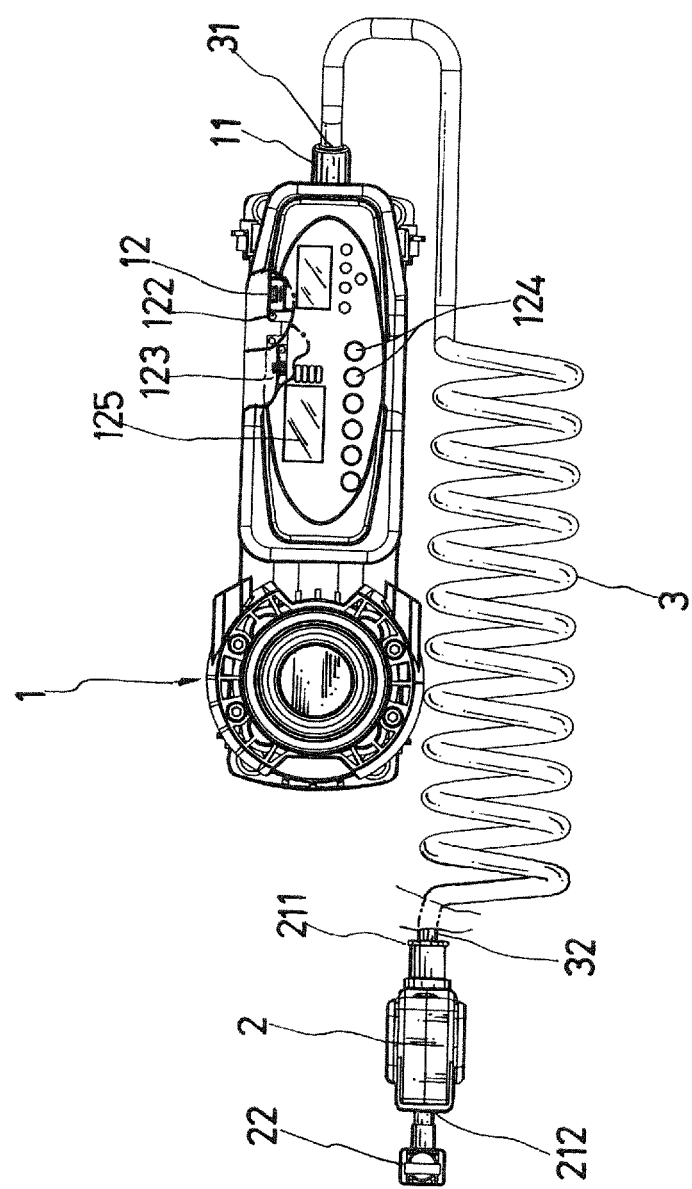
FIG. 2 is a top-view diagram showing the air compression system of FIG. 1.
Figure 3:
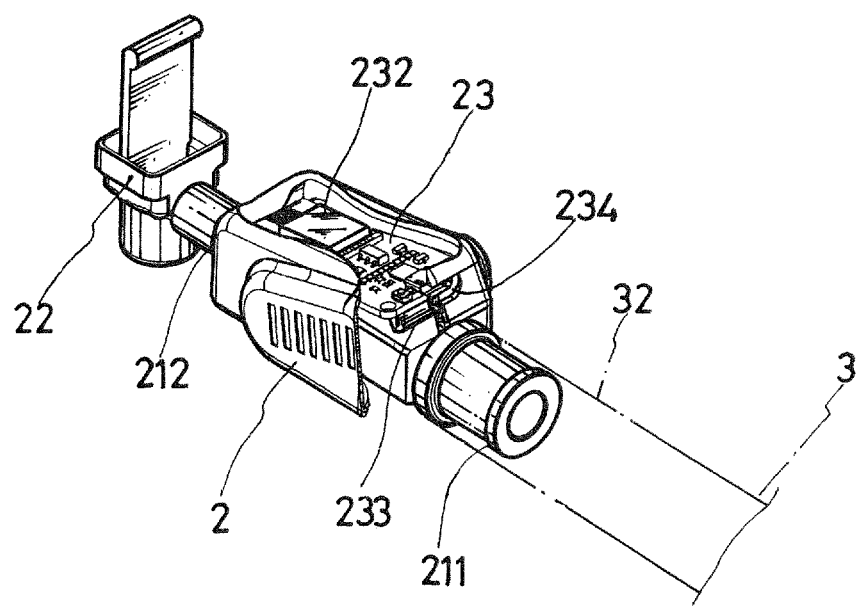
FIG. 3 is a perspective diagram showing a detection device of the air compression system of FIG. 1.
Figure 4:
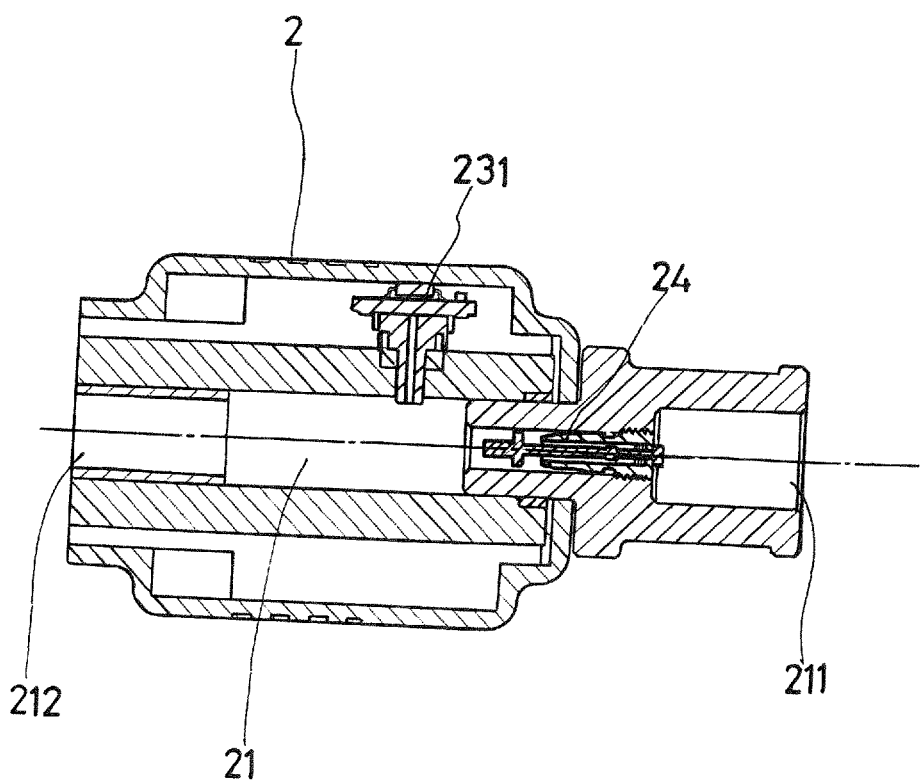
FIG. 4 is a sectional diagram showing the detection device of FIG. 3.

As shown in FIGS. 1 to 4, an air compression system according to an embodiment of the present invention includes an air compressor 1, a detection device 2, and a pipe 3.

The air compressor 1 has at least an output port 11, and a first control circuit 12. The first control circuit 12 is configured with a desired pressure to turn on or shut off the air compressor 1 depending on whether the desired pressure is reached. The first control circuit 12 is electrically connected to a first pressure transducer 121, and a first transceiver unit 122. The first pressure transducer 121 is housed inside the air compressor 1 adjacent to the output port 11 to detect an air pressure from the output port 11. The first transceiver unit 122 receives and transmits measurements from the detection device 2 to the first control circuit 12. The first control circuit 12 is further electrically connected to a second transceiver unit 123, a number of control buttons 124, and at least a display 125. The second transceiver unit 123 is wireless-connected to a mobile device, such as a smart phone, so that a user may operate the first control circuit 12 through the mobile device. The control buttons 124 allows the user to manually operate the first control circuit 12.

The first control circuit 12 is also electrically connected to a power cable, and a power motor of the air compressor 1. The power cable is connected to a power source, and electricity from the power source is delivered to the first control circuit 12, which in turn is distributed by the first control circuit 12 to the first pressure transducer 121, first transceiver unit 122, second transceiver unit 123, a number of control buttons 124, and a display 125.

The detection device 2 has a channel 21 inside. The channel 21 has an end configured with a first port 211 and another end configured with a second port 212. The second port 212 is connected to a nozzle 22. The detection device 2 also includes a second control circuit 23. The second control circuit 23 is electrically connected to a second pressure transducer 231, and a third transceiver unit 232. The second pressure transducer 231 is positioned between the first port 211 and the second port 212 detecting an air pressure in the channel 21. The third transceiver unit 232 mutually exchanges data with the first transceiver unit 122. The third transceiver unit 232 receives measurements from the second pressure transducer 231 and transmits the measurements to the first transceiver unit 122, which in turn transmits the measurements to the first control circuit 12. The detection device 2 has a conduit 24 extended from the channel 21 between the second pressure transducer 231 and the first port 211.

The second control circuit 23 is electrically connected to a battery module 233, and a charging port 234. The charging port 234 is connected to a power source so that the battery module 233 is charged, and the battery module 233 in turn powers the second control circuit 23, second pressure transducer 231, and third transceiver unit 232.

The pipe 3 has a first end 31, and a second end 32. The first end 31 is connected to the output port 11. The second end 32 is connected to the first port 211 of detection device 2. Therefore, compressed air from the air compressor 1 is ejected from the nozzle 22 through the output port 11, pipe 3, conduit 24, and channel 21.

The first control circuit 12 may be manually operated through the control buttons 124, or wireless-controlled through the mobile device. The display 125 visually presents operation messages, desired pressure, detected measures from the first pressure transducer 121 and second pressure transducer 231.

An operation scenario is as follows. The nozzle 22 of the detection device 2 is connected to an inlet of an object to be aerated such as a tire. A desired pressure is configured into the first control circuit 12 of the air compressor 1. When the air compressor 1 is turned on, the first pressure transducer 121 measures an air pressure p1 at the output port 11 of the air compressor 1 and transmits the measurement to the first control circuit 12. The second pressure transducer 231 measures an air pressure p2 in the channel 21 of the detection device 2 (i.e., the internal pressure within the aerated object), and the measurement is transmitted to the first transceiver unit 122 through the third transceiver unit 232, which in turn is transmit to the first control circuit 12. The first control circuit 12 compares the measure p1 from the first pressure transducer 121 and the measure p2 from the second pressure transducer 231, and obtain an estimated internal pressure p3 of the aerated object as a proxy to the true internal pressure of the aerated object. The first control circuit 12 compares the estimated internal pressure of the aerated object p3 and the desired pressure. If p3 is less than the desired pressure, the first control circuit 1 controls the air compressor 1 to pump air into the aerated object. If p3 is greater than the desired pressure, the first control circuit 12 controls the air compressor 1 to deflate the overly aerated object. When p3 is equal to the desired pressure, the first control circuit 12 controls the air compressor 1 to become idle.

It should be noted that, as the large-volume air from the air compressor 1 flows towards the detection device 2, it is regulated by the conduit 24 inside the detection device 2 so that it is compatible with the flow through the aerated object's inlet. In other words, air from the air compressor 1 enters the channel 21 of the detection device 2 in the controlled manner, so that the second pressure transducer 231 is not influenced by back pressure from an overly large volume of air and that the second pressure transducer 231 may accurately measure the pressure inside the channel 21 of the detection device 2. Additionally, this controlled flow into the channel 21 allows the air compressor 1 to aerate the object in a linear fashion.

Therefore, the gist of the present invention lies in the following. The first pressure transducer 121 is provided to measure an air pressure at the output port 11 of the air compressor 1. The second pressure transducer 231 in the detection device 2 measures an air pressure in the channel 21 of the detection device 2. The conduit 24 in the detection device 2 regulates an air flow to be compatible with that flowing through the inlet of the aerated object. The measurements from the first pressure transducer 121 and the second pressure transducer 231 are transmitted to and compared by the first control circuit 12 of the air compressor 1, and an internal pressure of the aerated object is estimated. When the estimated internal pressure of the aerated object is smaller than the desired pressure, the air compressor 1 pumps air into the object through the conduit 24 of the detection device 2 in a linear manner. As such, the conventional air compressor's problem of delivering large-volume air, causing back pressure at the nozzle, inaccurate measurement to the internal pressure of the aerated object, and failure to properly aerate the object can be resolved.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. An air compression system, comprising:
   an air compressor having at least an output port and a first control circuit, where the first control circuit is configured with a desired pressure, the first control circuit turns on or shuts off the air compressor based on the desired pressure, the first control circuit is electrically connected to a first pressure transducer and a first transceiver unit, and the first pressure transducer is housed inside the air compressor adjacent to the output port and detects an air pressure from the output port;
   a detection device having a channel inside, where the channel has an end configured with a first port and another end configured with a second port, the second port is connected to a nozzle, the detection device also has a second control circuit electrically connected to a second pressure transducer and a third transceiver unit, the second pressure transducer is positioned between the first port and the second port detecting an air pressure in the channel, the third transceiver unit receives measurements from the second pressure transducer and transmits the measurements to the first transceiver unit, which in turn transmits the measurements to the first control circuit, the detection device has a conduit extended from the channel between the second pressure transducer and the first port, and the conduit has an air flow compatible with that of an inlet of an aerated object; and
   a pipe having a first end and a second end, where the first end is connected to the output port, and the second end is connected to the first port of the detection device so that the air compressor is conducted to the detection device.

2. The air compression system according to claim 1, wherein the first control circuit is electrically connected to a second transceiver unit; the second transceiver unit is wireless-connected to a mobile device; and the first control circuit is operated through the mobile device.

3. The air compression system according to claim 1, wherein the first control circuit is electrically connected to a plurality of buttons and at least a display.

4. The air compression system according to claim 1, wherein the second control circuit is electrically connected to a battery module and a charging port; the charging port is connected to an external power source to charge the battery module; and the battery module powers the second control circuit, the second pressure transducer, and the third transceiver unit.

5. The air compression system according to claim 1, wherein the nozzle of the detection device is connected to an inlet of an object to be aerated; measurements from the first pressure transducer and the second pressure transducer are transmitted to and compared by the first control circuit to obtain an estimated internal pressure of the aerated object; and, when the estimated internal pressure of the aerated object is smaller than the desired pressure, the air compressor pumps air into the aerated object through the conduit of the detection device in a linear manner.

* * * * *